(12) United States Patent
Haga (10) Patent No.: US 9,374,488 B2
(45) Date of Patent: Jun. 21, 2016

(54) MANAGEMENT SYSTEM AND MANAGED APPARATUS, AND METHOD OF MANAGEMENT

(75) Inventor: Tatsuyoshi Haga, Hachioji (JP)

(73) Assignee: KONICA MINOLTA, INC. (JP)

( * ) Notice: Subject to any disclaimer, the term of this patent is extended or adjusted under 35 U.S.C. 154(b) by 403 days.

(21) Appl. No.: 12/897,944

(22) Filed: Oct. 5, 2010

(65) Prior Publication Data

US 2011/0087724 A1  Apr. 14, 2011

(30) Foreign Application Priority Data

Oct. 9, 2009  (JP) ................................ 2009-235220

(51) Int. Cl.
*G06F 15/16* (2006.01)
*H04N 1/00* (2006.01)

(52) U.S. Cl.
CPC ....... *H04N 1/00933* (2013.01); *H04N 1/00244* (2013.01); *H04N 1/00344* (2013.01); *H04N 1/00832* (2013.01); *H04N 2201/0094* (2013.01)

(58) Field of Classification Search
CPC . H04N 1/00; H04N 1/00244; H04N 1/00018; H04N 1/00209; H04N 1/00225; H04N 1/00241
USPC ........................................................ 709/202
See application file for complete search history.

(56) References Cited

U.S. PATENT DOCUMENTS

| 7,228,557 B1* | 6/2007 | Korehisa et al. ................. 725/86 |
| 2009/0070449 A1* | 3/2009 | Tanaka et al. ................. 709/223 |
| 2009/0083444 A1* | 3/2009 | Faist ............................. 709/248 |

FOREIGN PATENT DOCUMENTS

| JP | 11289586 A | 10/1999 |
| JP | 203271494 A | 9/2003 |
| JP | 2004264994 A | 9/2004 |
| JP | 2004295873 A | 10/2004 |
| JP | 2007048049 A | 2/2007 |
| JP | 2009-70001 A | 4/2009 |
| JP | 2009-70002 A | 4/2009 |

OTHER PUBLICATIONS

JP Office Action with English Translation for JP Patent Application No. 2009-235220; Reference No. B19879JP01; Mailing No. 361531; Date Mailed: Jun. 7, 2013; 7pgs.

* cited by examiner

*Primary Examiner* — Esther B Henderson
(74) *Attorney, Agent, or Firm* — Cantor Colburn LLP (57) ABSTRACT

A management system in which a plurality of managed apparatuses and a managing apparatus managing the plurality of managed apparatuses are connected so that they communicate via an HTTP server, wherein each of the managed apparatus includes: a communication section accessing the HTTP server and writing apparatus information indicating status of apparatus itself; a timing setting section setting a timing of accessing the HTTP server based on a unique value of apparatus itself set in advance; and a communication control section making the communication section operate periodically based on set timing information; wherein the managing apparatus includes; a communication section accessing the HTTP server and reading out the apparatus information of each of the managed apparatuses.

3 Claims, 11 Drawing Sheets

FIG. 1

10: MANAGEMENT SYSTEM (HTTP METHOD)

30: MANAGING APPARATUS

FIG. 4

DIRECTORY STRUCTURE OF WEBDAV SERVER

| DIRECTORY STRUCTURE | | | USAGE |
|---|---|---|---|
| ROOT | HOST A | REGIST | FOR COMMUNICATION OF VARIOUS SETTINGS |
| | | MACHINE 1 | FOR PERIODIC COMMUNICATION |
| | | MACHINE 2 | |
| | | MACHINE 3 | |
| | | ... | |
| | HOST B | REGIST | FOR COMMUNICATION OF VARIOUS SETTINGS |
| | | MACHINE A | FOR PERIODIC COMMUNICATION |
| | | MACHINE B | |
| | | MACHINE C | |
| | | ... | |
| | HOST C | REGIST | FOR COMMUNICATION OF VARIOUS SETTINGS |
| | | ... | FOR PERIODIC COMMUNICATION |
| | | ... | |

MANAGEMENT SYSTEM AND MANAGED APPARATUS, AND METHOD OF MANAGEMENT

RELATED APPLICATION

The present application is based on Patent Application No. 2009-235220 filed at the Japan Patent Office on Oct. 9, 2009 and which is hereby incorporated herein in its entirety.

TECHNICAL FIELD

The present invention relates to management systems and managed apparatuses as well as to methods of management, and particularly to management systems and managed apparatuses that carry out data writing/reading respectively from managing apparatuses and managed apparatuses using HTTP (Hypertext Transfer Protocol) servers as well as to methods of management.

BACKGROUND

Copying machines provided with the copying function or facsimile function, printer function, scanner function, etc., or multifunction peripherals (MFPs), etc., (hereinafter, all these are collectively called image forming apparatuses) are coming into widespread use. The operation rate of such image forming apparatuses is high and also they have a large number of consumable parts, and since it is necessary to carry out their periodic maintenance and inspection, at the time that the service personnel install the image forming apparatus at the user's premises, connect the image forming apparatus with the managing apparatus via a communication network, and register the image forming apparatus in the managing apparatus. Next, the managing apparatus obtains apparatus information such as the number of pages printed, usage frequency, maintenance history, replacement history of various types of parts, etc., from the image forming apparatus, and manages the image forming apparatus based on that apparatus information.

Here, as the method of communicating the apparatus information, the methods being used conventionally are, the method of connecting the managed apparatus such as image forming apparatuses and the managing apparatus via telephone lines or fax lines and carrying out transmission and reception via analog telephone lines by modulating the data signals using a modem, and the method of transmitting and receiving the data signals via digital telephone lines such as ISDN (Integrated Services Digital Network) (hereinafter referred to as the telephone line method).

Further, a method is being used in which the managed apparatus and the managing apparatus are connected via a communication network such as the Internet, converting emails describing the data into packets, and carrying out transmission and reception via a mail server (hereinafter referred to as the electronic mail method).

Further, a method has also been proposed of using an HTTP server such as a WebDAV (Distributed Authoring and Versioning protocol for the WWW) server, and carrying out writing and reading of data between the managing apparatus and each of the managed apparatuses (hereinafter referred to as the HTTP method). In addition, systems have also been proposed in which the transmission and reception of data is carried out using a communication method selected from a plurality of communication methods (see, for example, the following Patent Documents 1 and 2).

Since in the above HTTP method, unlike the conventional telephone line method or electronic mail method, the managed apparatus and the managing apparatus that are connected carry out data transmission and reception with a single WebDAV server, if the time of periodic reading or writing the apparatus information (hereinafter referred to as the periodic communication time) is the same for all managed apparatuses, there is the problem that the accesses to the server become concentrated.

In answer to this problem, it is possible to think of a method in which the service personnel adjusts so as to set different default periodic communication times for each of the individual managed apparatuses. However, a very large amount of time and labor will be required for adjusting the default periodic communication times for all the managed apparatuses connected to the HTTP server, also, there was the problem that bias will be present in the periodic communication time if adjusted manually.

The present invention was made in view of the above problems, and an important object of the present invention is to provide a management system and managed apparatus as well as a method of managing that avoid concentrated server accesses during periodic communication and make efficient management possible.

SUMMARY (1) To achieve at least one of the abovementioned objects, management system in which a plurality of managed apparatuses and a managing apparatus managing the plurality of managed apparatuses are connected so that they communicate via an HTTP server, reflecting one aspect of the present invention wherein, each of the managed apparatus includes: a communication section accessing the HTTP server and writing apparatus information indicating status of apparatus itself; a timing setting section setting a timing of accessing the HTTP server based on a unique value of apparatus itself set in advance; and a communication control section making the communication section operate periodically based on set timing information; wherein the managing apparatus includes; a communication section accessing the HTTP server and reading out the apparatus information of each of the managed apparatuses.

(2) In the abovementioned management system of item 1, wherein each of the managed apparatuses writes the timing information into the HTTP server; and, the managing apparatus reads out the timing information from the HTTP server, registers the timing information, and identifies the managed apparatus to be read the apparatus information based on the timing information.

(3) In the abovementioned management system of item 1, wherein the managing apparatus obtains the creation time of the apparatus information written by each managed apparatus, registers the creation time as the timing information of the managed apparatuses, and identifies the managed apparatus to be read the apparatus information based on the timing information.

(4) In the abovementioned management system of item 1, wherein the managing apparatus judges whether or not timing information set by a prescribed managed apparatus and timing information set by other managed apparatus coincides with one another, and notifies the coincidence to the prescribed managed apparatus via the HTTP server when the timing information coincides; and, the prescribed managed apparatus sifts the set by a predetermined fixed interval of time.

(5) In the abovementioned management system of item 1, wherein the unique value to the apparatus is a MAC address of the communication section of each of the managed apparatuses or a serial number of each of the managed apparatuses.

DESCRIPTION OF THE PREFERRED EMBODIMENTS

As was indicated regarding the background technology, as a method of managing managed apparatuses such as image forming apparatuses using a managing apparatus, the telephone line method, the electronic mail method, and the HTTP method have been known, and in recent years, the HTTP method is being used widely.

While in a management system of this HTTP method, periodically, the managed apparatus writes the apparatus information in the HTTP server, and the managing apparatus read apparatus information from the HTTP server, server accesses become concentrated if the timings of periodic communication from the managed apparatuses coincide, the server accesses will become concentrated.

Therefore, in a preferred embodiment of the present invention, in a management system using the HTTP method, the default periodic communication time for each managed apparatus is made using random numbers to deviate uniformly from a fixed value determined for each managed apparatus thereby avoiding the server accessed becoming concentrated in time. In the following, concrete explanations are given referring to the drawings.

[Preferred Embodiment 1]

Figure 1:
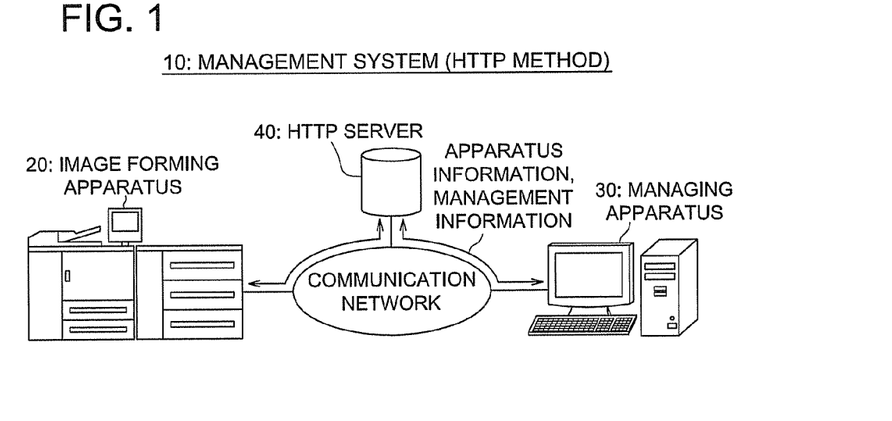
FIG. 1 is a diagram showing schematically the configuration of a management system according to a first preferred embodiment of the present invention.
Figure 2:
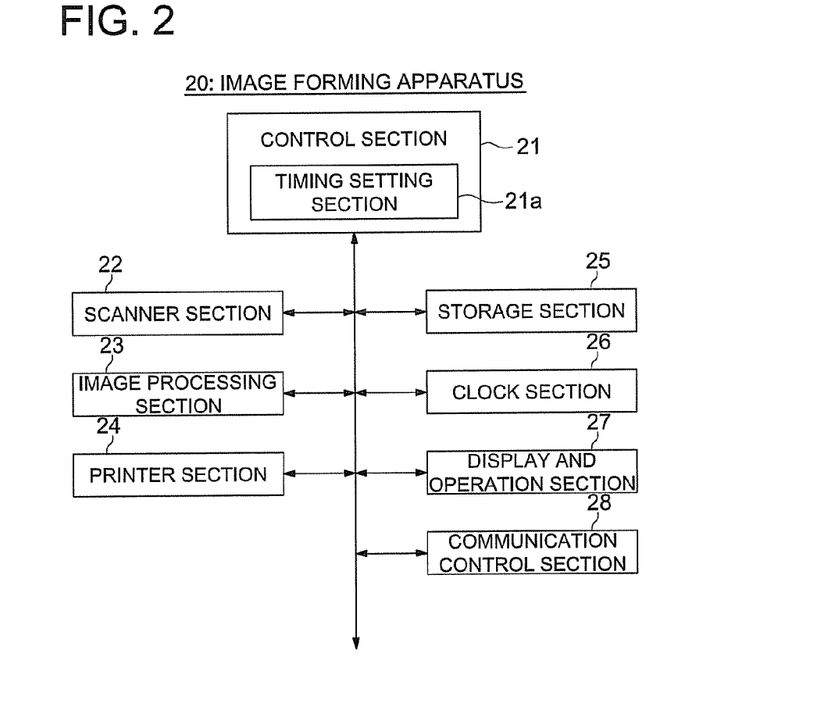
FIG. 2 is a block diagram showing the configuration of an image forming apparatus according to a first preferred embodiment of the present invention.
Figure 3:
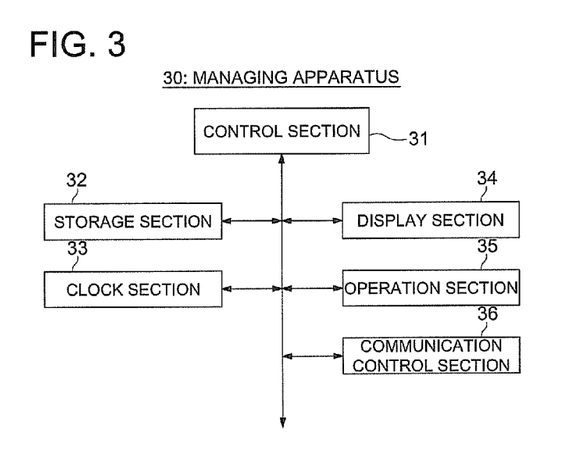
FIG. 3 is a block diagram showing the configuration of a managing apparatus according to a first preferred embodiment of the present invention.
Figure 4:
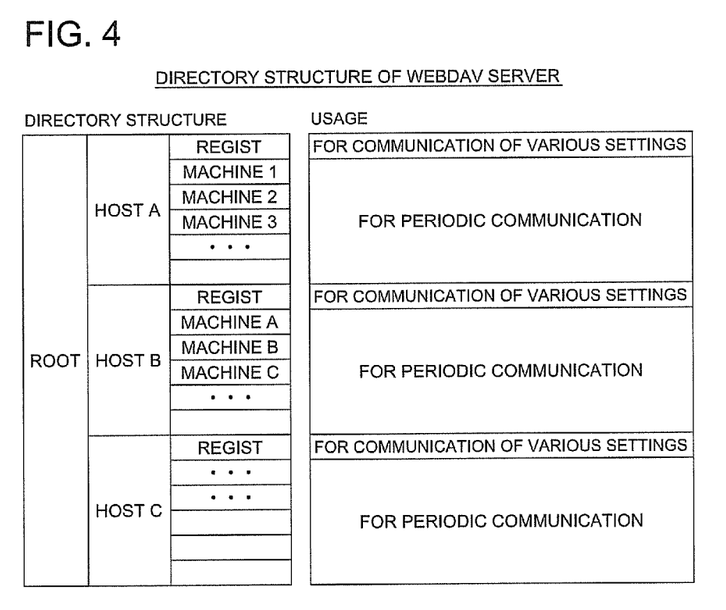
FIG. 4 is a diagram showing the directory structure of a WebDAV server according to a first preferred embodiment of the present invention.

To begin with, the management system and managed apparatus as well as the method of management according to a first preferred embodiment of the present invention are described with reference to FIG. 1 to FIG. 11. FIG. 1 is a diagram showing schematically the configuration of a management system according to the present preferred embodiment. Further, FIG. 2 is a block diagram showing the configuration of an image forming apparatus, and FIG. 3 is a block diagram showing the configuration of a managing apparatus according to a first preferred embodiment. FIG. 4 is a diagram showing the directory structure of a WebDAV server and FIG. 5 to FIG. 11 are flow charts showing the operations of the management system according to the present preferred embodiment.

As is shown in FIG. 1, a management system 10 according to the present preferred embodiment has one or a plurality of managed apparatuses (the image forming apparatuses 20 in the present preferred embodiment) which are the targets of management, and one or a plurality of managing apparatuses 30 that manage one or a plurality of those managed apparatuses, and these are connected to via a TCP/IP network to an HTTP server 40 such as a WebDAV server.

Further, information indicating the status of the managed apparatus (when the managed apparatus is an image forming apparatus, this is the information indicating the remaining quantity and time limit of consumable items such as toner empty, etc., the information indicating the status of use such as the counter value, etc., which are all referred to hereinafter as the apparatus information) is notified to the managing apparatus, and the information necessary for management (for example, notifying of the time of maintenance, or software update, etc., which are all referred to hereinafter as the management information) are notified from the managing apparatus to the managed apparatus.

Next, the concrete configurations of the image forming apparatus 20 and the managing apparatus 30 constituting the management system 10 of the present preferred embodiment are explained in detail.

[Image Forming Apparatus]

As is shown in FIG. 2, the image forming apparatus 20 has a control section 21, a scanner section 22, an image processing section 23, a printer section 24, a storage section 25, a clock section 26, a display and operation section 27, a communication control section 28, etc.

The control section 21 is constituted from a CPU (Central Processing Unit), a ROM (Read Only Memory), a RAM (Random Access Memory), etc. The CPU reads out the various programs stored in the ROM and expands them into the RAM, and following the expanded programs, not only carries out control of the different parts of the image forming apparatus 20, but also manages the statuses of the different parts.

The scanner section 22 is constituted from a light source that scans the original document, a CCD (Charge Coupled Device) that converts the light reflected from the original document into electrical signals, and an A/D converter that carries out A/D conversion of the electrical signals, etc., and reads out the information recorded in the original document.

The image processing section 23, for the image read out in the scanner section 22, or for the image based on a print job received via a communication network described later, carries out various types of image processings such as enlarging/reducing, rotating, frequency conversion, color conversion from RGB data to YMCK data, gradation correction, etc.

The printer section 24 is constituted from an image forming section that forms the image to be printed on an image transferring sheet, a transferring section that transfers the formed image to the image transferring sheet, a fixing section that fixes the transferred image, a conveying section that conveys the image transferring sheet, and a cleaning section that cleans the image forming section and the transferring section, etc., and forms and outputs on the image transferring sheet images based on the data that has been input using an electro-photographic process. In addition, it is provided with a means for monitoring the remaining quantity of toner, and a counter for counting the number of sheets of different sizes that have been printed out, etc., and transmits the apparatus information such as the remaining quantity of toner, the counter value, etc., to the control section 21.

The storage section 25 is constituted by flash memory or hard disk drive, etc., and stores the apparatus information of different sections or the management information of the managing apparatus 30, and the periodic communication time information.

The clock section 26 clocks the time, and notifies the time to the control section 21.

The display and operation section 27 is constituted using a liquid crystal display (LCD) device or an organic EL (Electroluminescence) display device, and on top of which is provided a pressure sensitive type operation section (touch panel) which is in the form of a transparent grid of electrodes and detects in terms of voltage values the X and Y coordinates of the point that has been pressed by a finger or a touch pen, and outputs the detected position signal as an operation signal to the control section 21.

The communication control section 28 connects the image forming apparatus 20 to a communication network. This communication control section 28 is provided with network interface hardware such as a network interface card (NIC) or a modem, etc., and has the functions of an HTTP client of writing the apparatus information to the HTTP server 40 (the WebDAV server) and reading the management information from the HTTP server 40 (the WebDAV server).

[Managing Apparatus]

As shown in FIG. 3, the managing apparatus 30 is provided with a control section 31, a storage section 32, a clock section 33, a display section 34, an operation section 35, and a communication control section 36, etc.

The control section 31 is constituted from a CPU, a ROM, a RAM, etc. The CPU reads out the various programs stored in the ROM and expands them into the RAM, and following the expanded programs, carries out control of the different parts of the managing apparatus 30. In addition, the control section 31 accesses the HTTP server 40 (the WebDAV server) via the communication control section 36, reads the apparatus information from the directories corresponding to the different image forming apparatuses 20, and carries out control of the statuses of the different image forming apparatuses 20 based on the obtained apparatus information.

The storage section 32 is constituted by flash memory or hard disk drive, etc., and stores the periodic communication time information of the different managed apparatuses obtained from the HTTP server 40 (the WebDAV server).

The clock section 33 clocks the time, and notifies the time to the control section 31.

The display section 34 is constituted from a liquid crystal display device or an organic EL display device, etc., and displays various types of management screens on the display screen following the display signal from the control section 31. In addition, the operation section 35 is constituted from a keyboard, mouse, etc.

The communication control section 36 is provided with network interface hardware such as an NIC, a modem, etc., and has the function as an HTTP client of reading the apparatus information from the HTTP server 40 (the WebDAV server) or of writing management data to the HTTP server 40 (the WebDAV server).

Further, the constitutions of the above image forming apparatus 20 and the managing apparatus 30 are mere examples, and can be altered suitably. For example, although in FIG. 2 the image forming apparatus 20 is being shown as a multi-function peripheral provided with a scanner section 22, an image processing section 23, and a printer section 24, it can also be a scanner or a printer, or a copying machine, and in addition, it can also be constituted to have and automatic document feeder (ADF), a finishing apparatus that carries out punching, stapling, stitching, etc.

In the following, the operation of a management system 10 with the above configuration is explained. However, although concentration of server accesses occurs both when the managed apparatuses write the apparatus information and the managing apparatus reads the apparatus information and when the managing apparatus writes the management information and the managed apparatuses read the management information, since in the HTTP method the reading and writing of the information are carried out simultaneously, in the present preferred embodiment the example is explained of the case in which the image forming apparatus 20 writes the apparatus information in the HTTP server 40 and the managing apparatus 30 reads the apparatus information from the HTTP server 40. Further, in the flow chart, the image forming apparatus 20 is called a machine, and the managing apparatus 30 is called a host.

Figure 5:
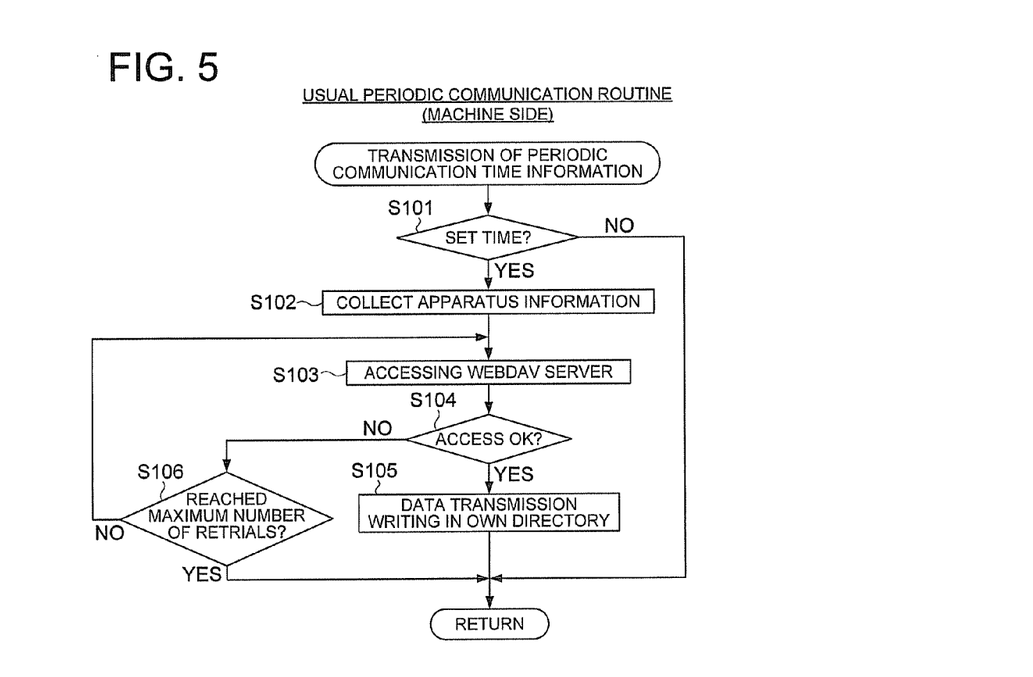
FIG. 5 is a flow chart showing the usual periodic communication routine on the managed apparatus side.
Figure 6:
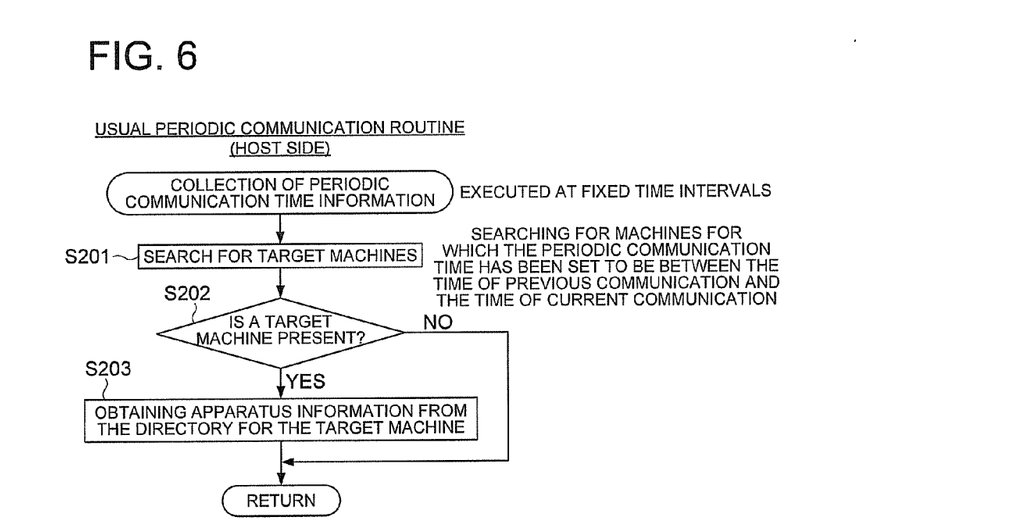
FIG. 6 is a flow chart showing the usual periodic communication routine on the managing apparatus side.

To begin with, an usual periodic communication routine is explained referring to FIG. 5 and FIG. 6.

[Operation in the Image Forming Apparatus 20]: See FIG. 5

The control section 21 of the image forming apparatus 20 determines whether or not the current time that is notified from the clock section 26 is equal to the periodic communication time that has been set in advance (S101). If it is equal to the periodic communication time, the apparatus information is collected from the printer section 24, etc. (S102), and the HTTP server 40 (the WebDAV server) is accessed using the communication control section 28 (S103).

If the access is OK, the collected apparatus information is written in the directory that has been assigned in advance for that apparatus (S105). On the other hand, if the access is N.G. (no good), a decision is made as to whether or not the number of accesses has reached the maximum number of retrials that has been determined in advance (S106), and if the maximum number of retrials has not been reached, the access is repeated again going back to Step S103.

[Operation in the Managing Apparatus 30]: See FIG. 6

The control section 31 of the managing apparatus 30 searches for the image forming apparatus 20 whose periodic communication time has been set to be between the previous time and the current time (S201). Next, if there is a target image forming apparatus (Yes in S202), the apparatus information is obtained from a directory that has been allocated for that image forming apparatus 20 (S203).

Here, as has been explained above, if the periodic communication time has been set to the same time by default, a plurality of image forming apparatuses will access the HTTP server 40 (The WebDAV server) simultaneously. In view of this, in the present preferred embodiment, the default periodic communication time for each image forming apparatus 20 is made to deviate uniformly using random numbers from a fixed value determined for each image forming apparatus 20, thereby avoiding the concentration of access. In concrete terms, as has been shown in FIG. 2, in the control section 21, a timing setting section 21a is provided by hardware or software, the timing setting section 21a obtains the unique value to the image forming apparatus such as by obtaining the MAC (Media Access Control) address from the communication control section 28, or by obtaining the serial number from the storage section 25, and converts that unique value into time using a calculation equation determined in advance, and registers that time as the periodic communication time.

Although it is possible to use any one of the serial number and the MAC address as this unique value to the apparatus, if the serial number is used, since it is likely to get erased or changed at the time of shipment from the factory or at the time of changing the destination, it is desirable to use the MAC address which has been determined for each network device. Further, when there are a plurality of NICs (for example, for printing and for maintenance), using the MAC address, it is possible to set the time separately for each of them.

Further, due to the spreading use of the HTTP method, the apparatus information of an extremely large number of image forming apparatuses will have to be managed by a single HTTP server 40, and problems with the server occur such as the access speed decreasing exponentially with increase in the number of directories. This is because all the directories will have to be searched since the managing apparatus 30 has not grasped the directory for which image forming apparatus is there an updating. In view of this, in the present preferred embodiment, the periodic communication time set in the image forming apparatus 20 is notified to the managing apparatus 30, and it has been made sufficient for the managing apparatus 30 to check only the directory for the image forming apparatus corresponding to that periodic communication time.

In the following, the procedure of setting the periodic communication time using the MAC address is explained referring to FIG. 7 and FIG. 8.

[Operation in the Image Forming Apparatus 20]: See FIG. 7

To begin with, a selection is made as to whether the user manually sets the periodic communication time or the setting is made automatically at random (S301).

When random setting is selected, the control section 21 (the timing setting section 21a) of the image forming apparatus 20 obtains from the communication control section 28 the MAC address embedded in the NIC (S302), and generates a random time from the obtained MAC address (S303). Although the method of generating this random time is not particularly stipulated, it is possible to consider, for example, a method in which a random value is obtained by taking the MAC address (either all the digits, or only a part of the digits such as the lowermost four digits, etc.) as the seed, dividing the obtained random value into 24 hours×60 minutes=1440 minutes, and taking the remainder as the random time.

Next, the control section 21 (the timing setting section 21a) displays the generated random time and asks the user to confirm (S304), and if the user confirms it as being OK (Yes in S305), that time is stored in the storage section 25 (S306). In addition, the control section 21 (the timing setting section 21a), when manual setting has been selected in S301, or else when the random time generated based on the MAC address is N.G. (No in S305), a request is made to the user to input the periodic communication time manually by operating the display and operation section 27 (S308).

After that, the control section 21 (the timing setting section 21a) accesses the HTTP server 40 (the WebDAV server), and writes the set periodic communication time as a setting file in the directory for settings (for example, in the directory "regist" in FIG. 4).

[Operation in the Managing Apparatus 30]: See FIG. 8

The control section 31 of the managing apparatus 30 accesses the directory for settings (for example, in the directory "regist" in FIG. 4) in the HTTP server 40 (the WebDAV server) (S401). Although the timing or frequency of this access is not stipulated, in order to obtain the periodic communication time quickly, it is desirable to execute this frequently. Further, while it consumes a lot of time to check all the directories of the HTTP server 40 (the WebDAV server), in the present preferred embodiment, since it is sufficient to check only the directories for settings, it is possible to reduce greatly the processing load on the managing apparatus 30.

Next, the control section 31 determines whether or not there is a setting file in the directory for settings (S402), and if there is a setting file, it obtains the setting information (the ID of the image forming apparatus or the periodic communication time information, etc.) (S403), registers the obtained periodic communication time information in the storage section 32 while establishing correspondence with the ID of the image forming apparatus 20 (S404), and after that, deletes the setting file from the directory for settings (S405).

By using the MAC address in this manner, while it is possible to make the periodic communication times of the different image forming apparatuses 20 dispersed uniformly, depending on the method of calculation, it is probable that the periodic communication times of a plurality of image forming apparatuses 20 coincide with one another. In such a situation, it is possible to avoid the periodic communication times from coinciding with one another by shifting the periodic communication time registered later by a fixed interval of time. In the following, the operations in that case are explained referring to FIG. 9 to FIG. 11.

[Operation in the Image Forming Apparatus 20]: See FIG. 9

Figure 7:
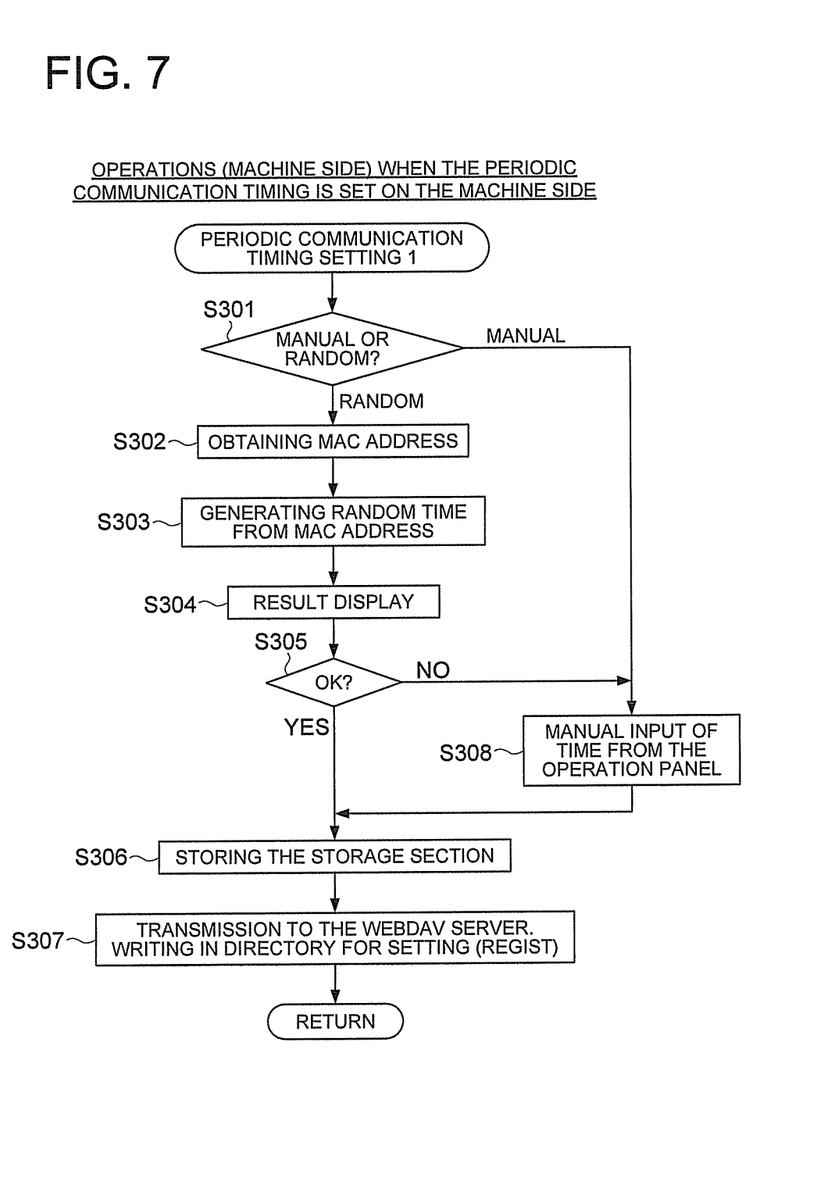
FIG. 7 is a flow chart showing the procedure of setting the periodic communication time (the operation on the managed apparatus side) according to a first preferred embodiment of the present invention.
Figure 8:
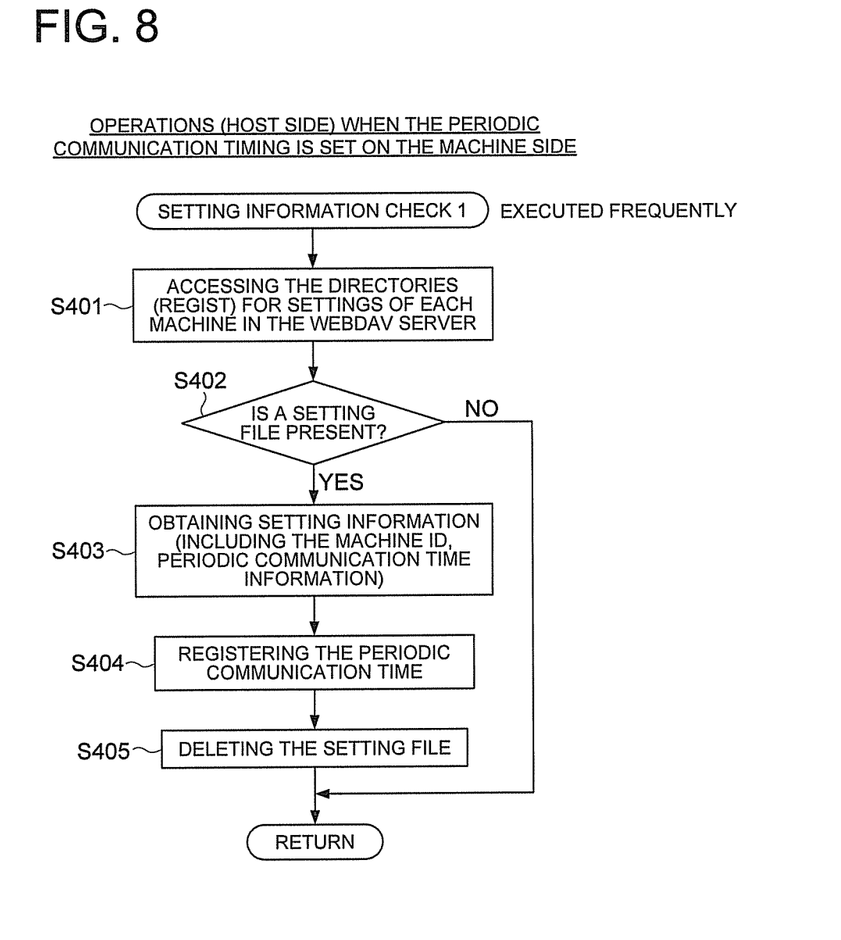
FIG. 8 is a flow chart showing the procedure of setting the periodic communication time (the operation on the managing apparatus side) according to a first preferred embodiment of the present invention.
Figure 9:
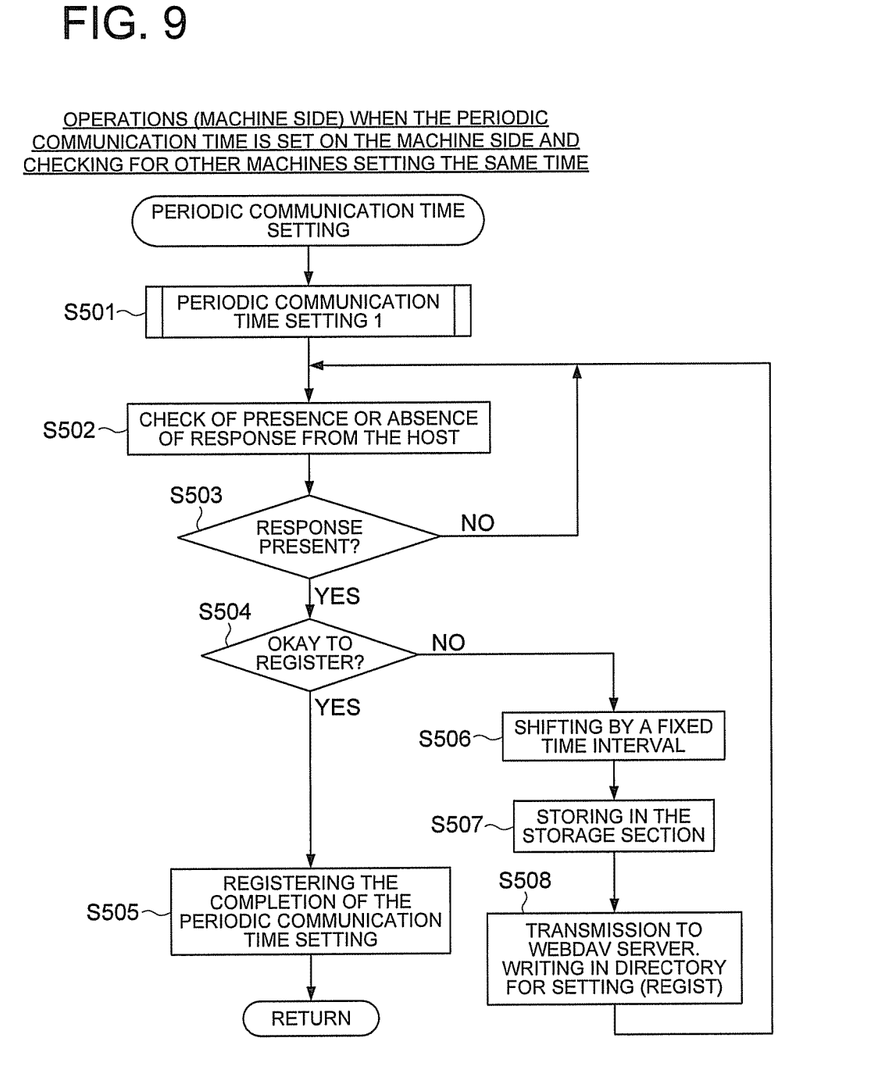
FIG. 9 is a flow chart showing another procedure of setting the periodic communication time (the operation on the managed apparatus side) according to a first preferred embodiment of the present invention.

To begin with, the control section 21 (the timing setting section 21a) of the image forming apparatus 20 sets the periodic communication time according to the flow shown in FIG. 7, and transmits it to the HTTP server 40 (the WebDAV server) (S501).

Next, the control section 21 (the timing setting section 21a) checks if there is an answer from the managing apparatus 30 in the directory for settings for that apparatus in the HTTP server 40 (the WebDAV server) (S502). If an answer is present (Yes in S503), the control section 21 determines whether or not the answer is "registration OK" (S504), and if the answer is "registration OK", it registers the completion of setting of the periodic communication time.

On the other hand, if the answer is "registration N.G.", the control section 21 shifts the set periodic communication time by a fixed interval of time (S506) and registers the shifted periodic communication time in the storage section 25 (S507). Next, the control section 21 accesses the HTTP server 40 (the WebDAV server), and after writing the shifted periodic communication time in the directory for settings (S508), returns to Step S502.

[Operation in the Managing Apparatus 30]: See FIG. 10 and FIG. 11

Figure 10:
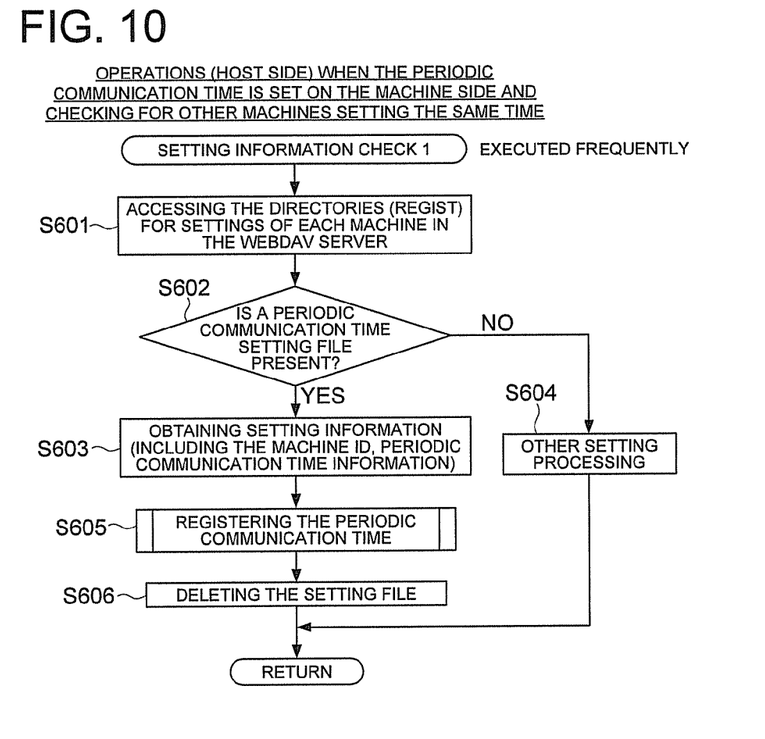
FIG. 10 is a flow chart showing another procedure of setting the periodic communication time (the operation on the managing apparatus side) according to a first preferred embodiment of the present invention.

The control section 31 of the managing apparatus 30 accesses the directory for settings for that image forming apparatus 20 in the HTTP server 40 (the WebDAV server) (S601). Next, the control section 31 determines whether or not there is a setting file of the periodic communication time information in the directory for settings (S602), and if there is a setting file, it obtains the setting information (the ID of the image forming apparatus 20 or the periodic communication time information, etc.) (S603), carries out the processing of registering the periodic communication time described later (S605), and after that, deletes the setting file. On the other hand, if there is no setting file, the control section 31 carries out other setting operations (S604).

Figure 11:
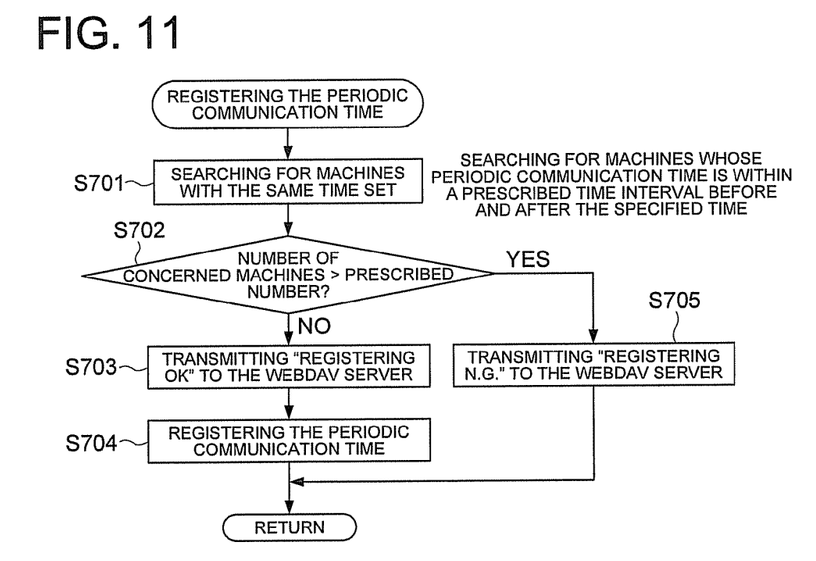
FIG. 11 is a flow chart showing the procedure of registering the periodic communication time (the operation on the managing apparatus side) according to a first preferred embodiment of the present invention.

FIG. 11 shows the details of the periodic communication time registration processing, in which, to begin with, the control section 31 searches whether there is an image forming apparatus 20 whose periodic communication time has been set within a prescribed time interval before and after the periodic communication time of a certain image forming apparatus 20 (S701). However, the above prescribed time interval can be set suitably according to the number of image forming apparatuses 20 connected to the communication network, or the processing capacity of the HTTP server 40 (the WebDAV server), etc.

Here, while it is possible to set the periodic communication times of all image forming apparatuses 20 to different times, concentrated accesses of the server will not be a problem if the number of image forming apparatuses that have been set to the same time is less than a prescribed number. Therefore, a determination is made as to whether or not the number of image forming apparatuses set to the same time exceeds a prescribed number (S702), and the control section 31, if the prescribed number is exceeded, transmits "Registering N.G." to the HTTP server 40 (the WebDAV server) (S705). On the other hand, if the prescribed number has not been exceeded, the control section 31, transmits "Registering OK" to the HTTP server 40 (the WebDAV server) (S703), and registers that periodic communication time in the storage section 32 while establishing correspondence with the ID of that image forming apparatus 20 (S704).

As has been explained above, by setting the periodic communication time based on the MAC address, etc., on the image forming apparatus 20 side, it is possible to avoid concentration of accesses to the server. In addition, by notifying that periodic communication time to the managing apparatus 30, since it is sufficient for the managing apparatus 30 to check only the directory in the HTTP server 40 (the WebDAV server) corresponding to the image forming apparatus 20 that has carried out periodic communication, it is possible to reduce the processing load on the managing apparatus 30.

Further, in the above preferred embodiment, although the explanations were given for the case in which the timing setting section was provided in the image forming apparatus 20, it is also possible to provide it in the managing apparatus 30. In this case, the MAC address is obtained by the image forming apparatus 20 and written in the directory for settings in the HTTP server 40, and the managing apparatus obtains the MAC address from that directory for settings and sets the periodic communication time, and writes the set periodic communication time in the directory for settings of the HTTP server 40, and the image forming apparatus 20 can obtain the periodic communication time from that directory for settings.

[Preferred Embodiment 2]

Figure 12:
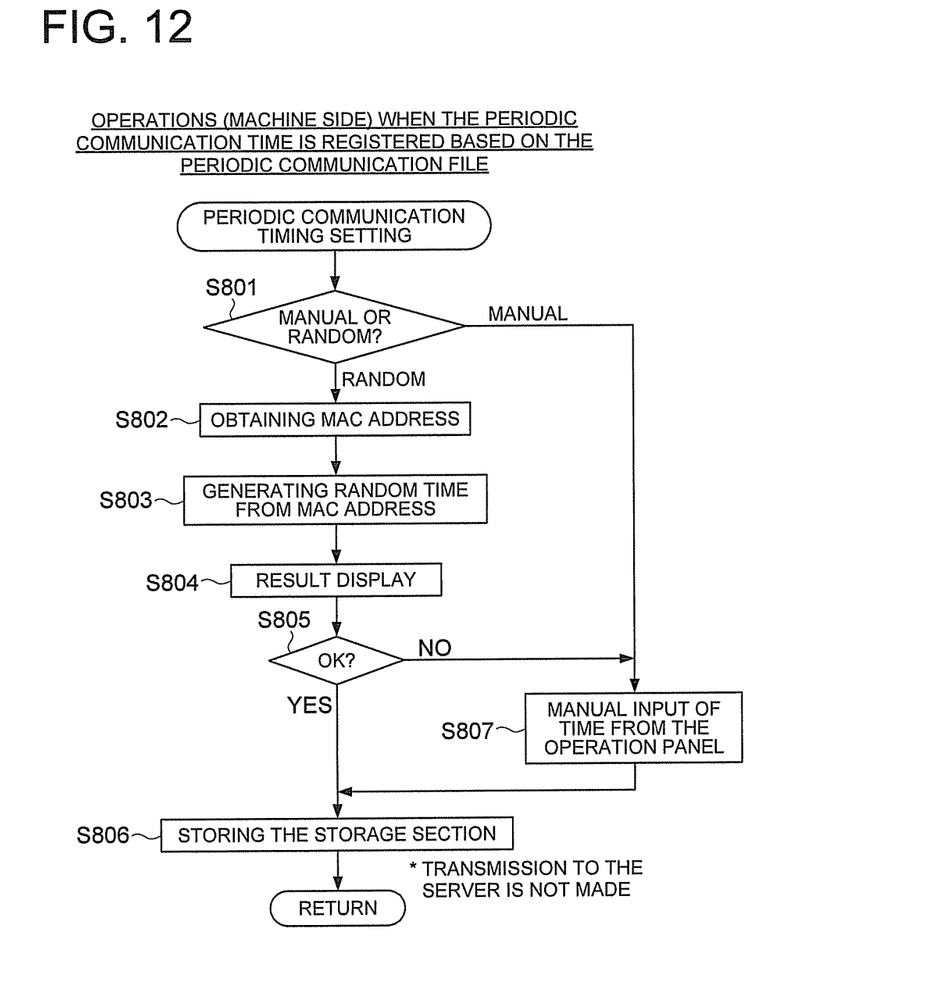
FIG. 12 is a flow chart showing another procedure of setting the periodic communication time (the operation on the managed apparatus side) according to a second preferred embodiment of the present invention.
Figure 13:
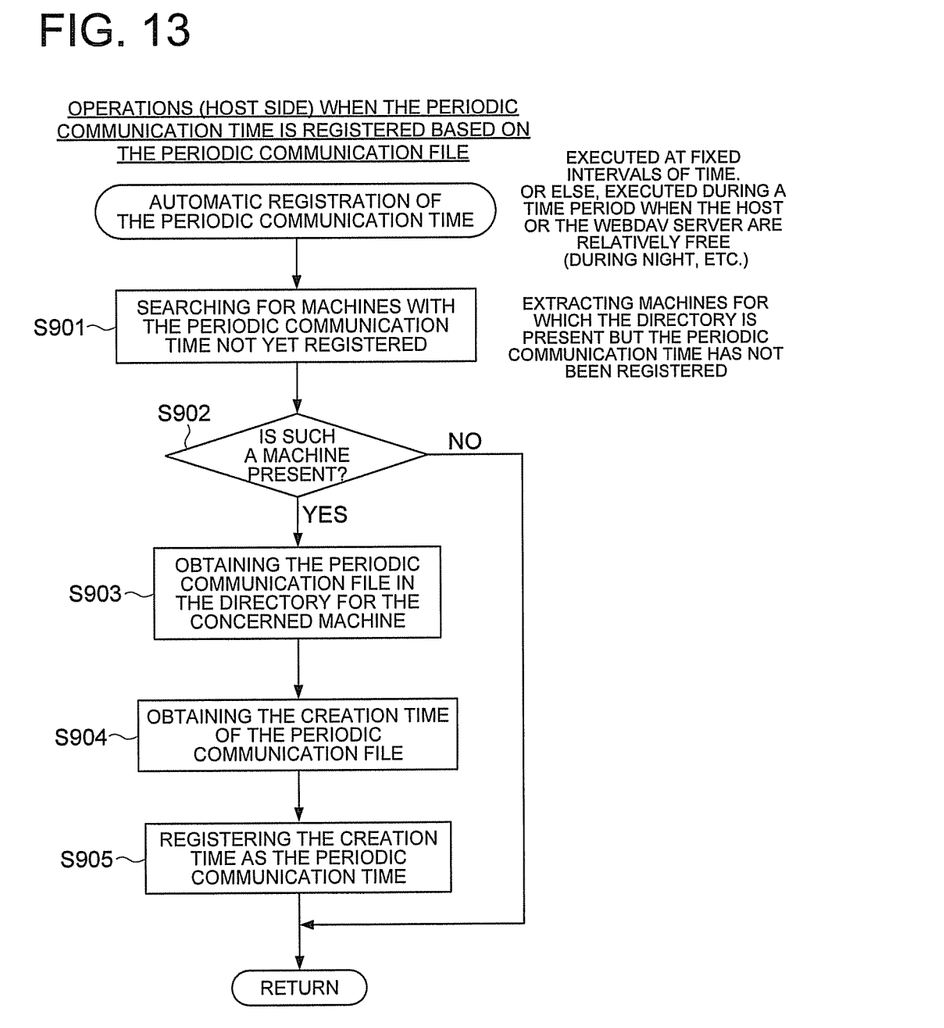
FIG. 13 is a flow chart showing another procedure of setting the periodic communication time (the operation on the managing apparatus side) according to a second preferred embodiment of the present invention.

Next, the management system and managed apparatus as well as the method of management according to a second preferred embodiment of the present invention are described with reference to FIG. 12 and FIG. 13. FIG. 12 and FIG. 13 are flow charts showing the operations of the management system according to the present preferred embodiment.

While in the first preferred embodiment described above, a method was explained in which the periodic communication time set randomly or manually is communicated to the managing apparatus 30, and the managing apparatus 30 registers that periodic communication time for each image forming apparatus 20, it is possible to set the periodic communication time by the managing apparatus 30 reading out the updating time of the file in the HTTP server 40.

In other words, when the file placed in the HTTP server 40 is the periodic communication information, since the time of creation of that file is the same as the periodic communication time it is also possible to set the periodic communication time based on the time of creation of that file. In this method, not only is it possible to eliminate the number of steps installed in the image forming apparatus 20 and to make it simpler, but also, even if the time setting in the image forming apparatus 20 is shifted, since the time of file creation becomes the management in the HTTP server 40, adjusting individual times becomes unnecessary.

In the following, the procedure for setting the periodic communication time using the periodic communication file is explained while referring to FIG. 12 and FIG. 13.

[Operation in the Image Forming Apparatus 20]: See FIG. 12

To begin with, a selection is made as to whether the user manually sets the periodic communication time or the setting is made automatically at random (S801).

If the setting is to be made randomly, the control section 21 (the timing setting section 21*a*) obtains the MAC address embedded in the NIC (S802) from the communication control section 28, and generates a random time from the obtained MAC address (S803).

Next, the control section 21 displays the generated random time and asks the user to confirm (S804), and if the user confirms it as being OK (Yes in S805), that time is stored in the storage section 25 (S806). In addition, if manual setting has been selected in S801, or else when the random time generated based on the MAC address is N.G. (No in S805), the user inputs the periodic communication time manually by operating the display and operation section 27 (S807).

However, in the case of the present preferred embodiment, transmission of the set periodic communication time to the HTTP server 40 (the WebDAV server) is not made.

[Operation in the Managing Apparatus 30]: See FIG. 13

The control section 31 of the managing apparatus accesses the directories for settings in the HTTP server 40 (the WebDAV server), and searches for an image forming apparatus 20 for which the periodic communication time has not been set (S901). In other words, the control section 31 extracts image forming apparatuses for which there are corresponding directories in the HTTP server 40 (the WebDAV server) but the periodic communication time has not been registered.

Next, when a corresponding image forming apparatus is present (Yes in S902), the control section 31 obtains the periodic communication file inside the directory for the corresponding image forming apparatus 20 (S903), obtains the creation time from the property or file name of that periodic communication file (S904), and registers the obtained creation time as the periodic communication time in the storage section 32 while establishing correspondence with the image forming apparatus 20 (S905).

In this manner, even by setting the periodic communication time in the image forming apparatus based on the MAC address, etc., and writing the periodic communication file in the HTTP server 40, and the managing apparatus 30 registering the creation time of the periodic communication file as the periodic communication time, similar to the first preferred embodiment it is possible to avoid concentration of accesses to the server, and also, it is possible to reduce the processing load on the managing apparatus 30.

Further, even in the present preferred embodiment, when the periodic communication times of a plurality of image forming apparatuses coincide with one another, similar to the first preferred embodiment, it is also possible to carry out processing of shifting the periodic communication times by a fixed time interval.

[Preferred Embodiment 3]

Figure 14:
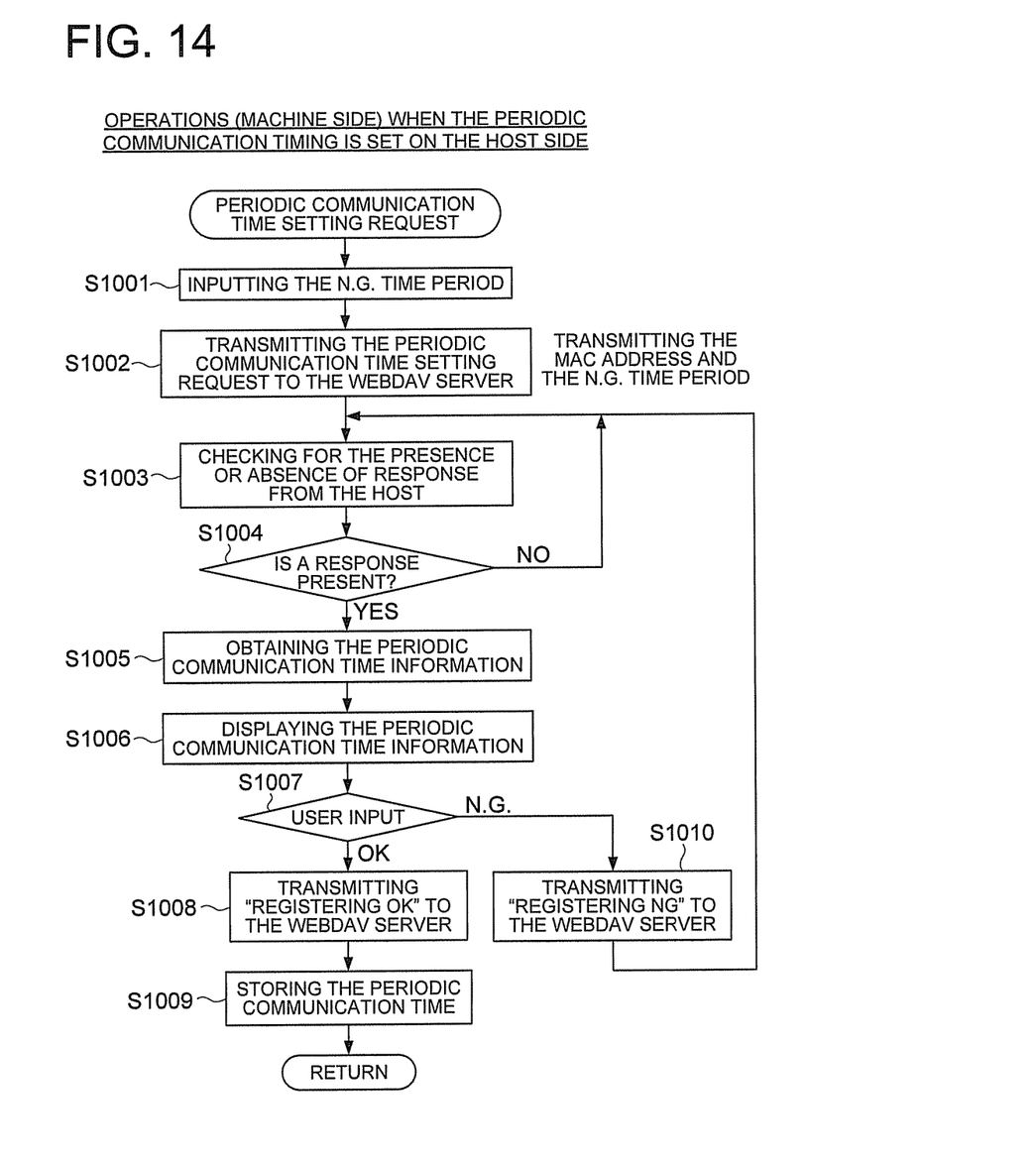
FIG. 14 is a flow chart showing another procedure of setting the periodic communication time (the operation on the managed apparatus side) according to a third preferred embodiment of the present invention.
Figure 15:
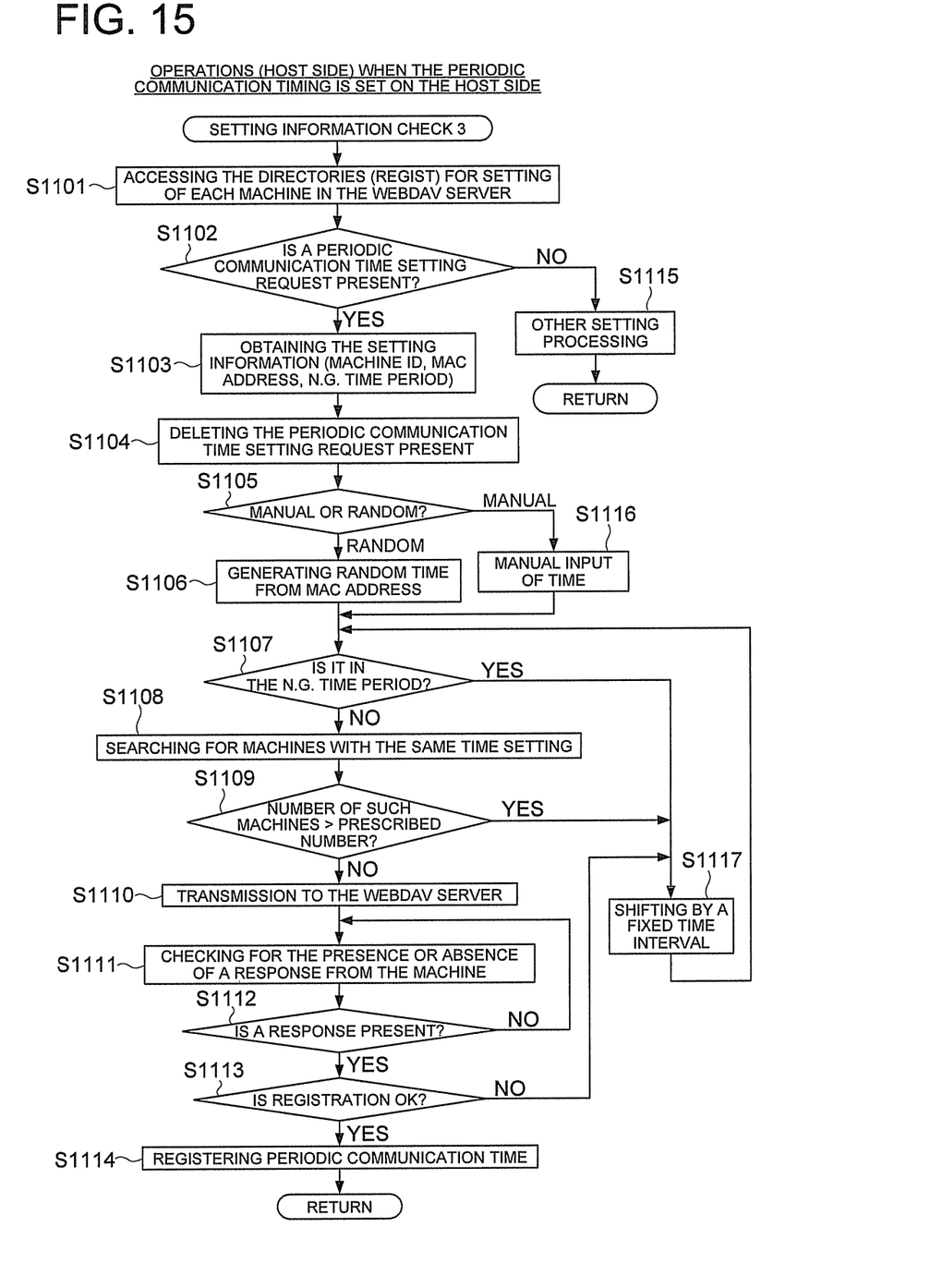
FIG. 15 is a flow chart showing another procedure of setting the periodic communication time (the operation on the managing apparatus side) according to a third preferred embodiment of the present invention.

Next, the management system and managed apparatus as well as the method of management according to a third preferred embodiment of the present invention are described with reference to FIG. 14 and FIG. 15. FIG. 14 and FIG. 15 are flow charts showing the operations of the management system according to the present preferred embodiment.

While in the first and second preferred embodiments described above, the periodic communication time was set in the image forming apparatus 20, in these methods, since the periodic communication time is determined uniquely for each image forming apparatus 20, there will be cases in which it is not possible to make the settings dependent on the network environment. For example, in cases such as wanting to carry out random transmission during the night when the communication charges are lower, it was not possible to make changes later on automatically.

In view of this, in the present preferred embodiment, a timing setting section is provided in the control section 31 of the managing apparatus 30, and random time setting has been made possible from the managing apparatus 30. For example, if night random is selected in the managing apparatus 30, a random time at night (for example, between 21:00 to 06:00) is allocated to the image forming apparatuses that are being managed, and the periodic communication setting commands are transmitted to the respective image forming apparatuses 20. An image forming apparatus 20 that receives this command overwrites its periodic communication time, and carries out the periodic communications thereafter according to that periodic communication time.

Even in this case, when it is not possible to carry out periodic communication at some other time because the image forming apparatus 20 is operating, or because of conditions of the communication lines, it is desirable to make in the image forming apparatus 20 possible to reject the remote time setting by the managing apparatus 30.

In the following, the procedure for setting the periodic communication time in the managing apparatus 30 is explained with reference to FIG. 14 and FIG. 15.

[Operation in the Image Forming Apparatus 20]: See FIG. 14

To begin with, when the user inputs the N.G. time period by making operations in the display and operation section 27 (S1001), the control section 21 of the image forming apparatus 20 accesses the HTTP server 40 (the WebDAV server), and writes in the directory for settings corresponding to it a request for setting the periodic communication time including MAC address itself and the N.G. time period (S1002).

Next, the control section 21, checks for the presence or absence of an answer from the managing apparatus 30 (S1003), if an answer is present (Yes in S1004), obtains the periodic communication time information (S1005), displays the obtained periodic communication time information in the display and operation section 27 and asks the user to confirm it (S1006). If the user inputs OK (Yes in S1007), the control section 21 transmits "registration OK" to the HTTP server 40 (the WebDAV server) (S1008), and registers that periodic communication time information in the storage section 25 (S1009). On the other hand, if the user inputs N.G. (No in S1007), the control section transmits "registration N.G." to the HTTP server 40 (the WebDAV server), and returns to Step S1003.

[Operation in the Managing Apparatus 30]: See FIG. 15

The control section 31 of the managing apparatus 30 accesses the directories for settings of each of the image forming apparatuses 20 in the HTTP server 40 (the WebDAV server) (S1101), and the control section 31 determines whether or not there is a periodic communication time setting request in the directory for settings (S1102). When there is a periodic communication time setting request, the control section 31 obtains the setting information (the ID or MAC address of the image forming apparatus 20, the N.G. time period, etc.,) (S1103), and deletes the periodic communication time setting request from that directory for settings (S1104). Further, when there is not periodic communication time setting request, the control section 31 carries out the processing of other settings (S1115).

Next, the user selects whether the user should manually set the periodic communication time or the setting is made automatically at random (S1105), and when the random setting has been selected, the control section 31 (the timing setting section) generates a random time from the MAC address obtained in S1103 (S1106). On the other hand, if manual setting has been selected, the user manually inputs the periodic communication time by making operations in the operation section 35 (S1116).

Next, the control section 31 determines whether or not the set periodic communication time is within the N.G. time period obtained in S1103 (S1107), an if the time is not within the N.G. time period, a search is made as to whether or not there are other image forming apparatuses 20 making settings of the same time (S1108). If they are present, the control section 31 determines whether the number of image forming apparatuses that have set the same time exceeds a prescribed number (S1109), and if the prescribed number of units has not been exceeded, it transmits the periodic communication time information to the HTTP server 40 (the WebDAV server) (S1110), and checks whether or not there is a response from the image forming apparatus 20 (S1111). If there is a response from the image forming apparatus 20 (Yes in S1112), the control section 31 checks whether the received response is "registration OK" or not (S1113), and if the response is "registration OK", it registers that periodic communication time information in the storage section 32 while establishing correspondence with the ID of that image forming apparatus 20 (S1114).

If the periodic communication time set in S1107 is within the N.G. time period, or when the number of units of image forming apparatuses 20 in S1109 exceeds the prescribed number of units, or if the response is "registration N.G." in S1113, the control section shifts the periodic communication time by a fixed time interval (S1117), and returns to Step S1107.

In this manner, even by setting the periodic communication time in the managing apparatus 30 based on the MAC address of the image forming apparatus, similar to that in the first preferred embodiment, it is possible to avoid concentration of accesses to the server, and also, it is possible to reduce the processing load on the managing apparatus 30.

Further, the setting of the N.G. time period is not mandatory, and it is also possible to eliminate the determination of whether or not the periodic communication time is within the N.G. time period and the processing of shifting the periodic communication time by a fixed time interval.

Further, in each of the above preferred embodiments, although examples were explained in which image forming apparatuses were shown as the managed apparatuses, the present invention shall not be construed to be restricted to this, and it is possible to apply the present invention in a similar manner to any apparatus that desirably requires remote management.

According to each of the above preferred embodiments, it is possible to avoid concentration of server accesses during periodic communications, and to carry out efficient management. The reason for this is that control is carried out of making the periodic communication times of a plurality of managed apparatuses dispersed uniformly using random numbers based on the MAC (Media Access Control) addresses.

What is claimed is:

1. A managed apparatus connected to managing apparatus via an HTTP server so as to communicate with the managing apparatus, the managed apparatus comprising:
    a communication control section comprising network interface hardware, the communication control section being structured to access the HTTP server and writes apparatus information indicating status of apparatus itself; and
    a control section comprising:
        a central processing unit (CPU);
        read-only memory (ROM); and
        random access memory (RAM);
        wherein the control section is structured to set a timing of accessing the HTTP server each time the communication control section accesses the HTTP server, based on a unique value of apparatus itself set in advance,
    wherein the control section is structured to make the communication control section operate based on the set timing.

2. The managed apparatus of claim 1,
    wherein the unique value to the apparatus is a MAC address of the communication control section or a serial number.

3. A method of management for a management system in which a plurality of managed apparatuses and a managing apparatus managing the plurality of managed apparatuses are connected so that they communicate via an HTTP server, the method comprising:
    setting, by each of the managed apparatuses, a timing of accessing the HTTP server each time the communication control section accesses the HTTP server, based on a unique value of apparatus itself set in advance;
    accessing, by each of the managed apparatuses, the HTTP server based on the set timing and writing apparatus information indicating status of apparatus itself; and
    accessing, by the managing apparatus, the HTTP server and reading out the apparatus information of each of the managed apparatuses.

* * * * *